No. 685,702. Patented Oct. 29, 1901.
E. WHALLEY.
MILL TRUCK.
(Application filed Mar. 29, 1901.)
(No Model.)
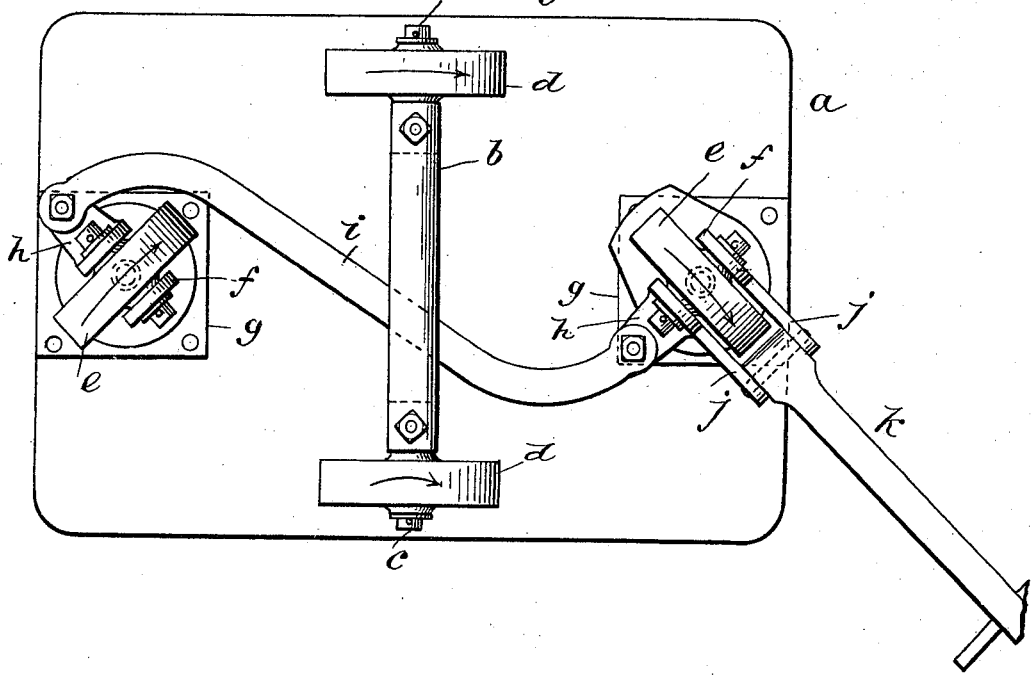
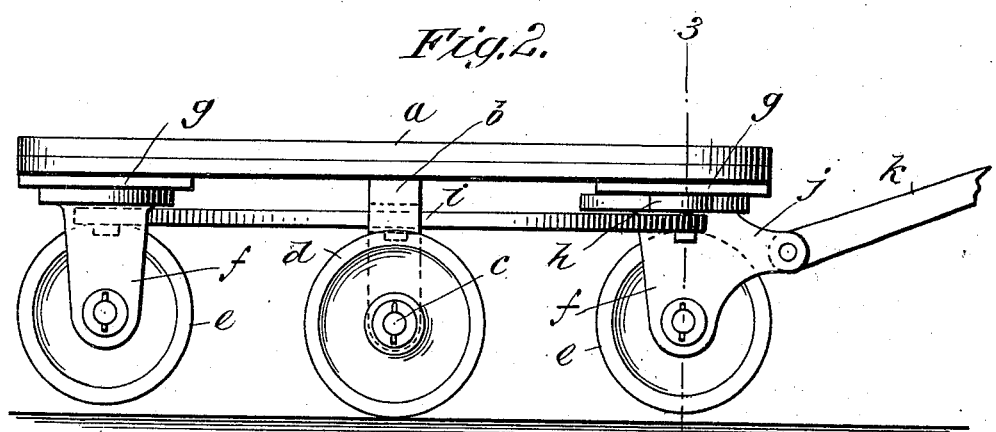
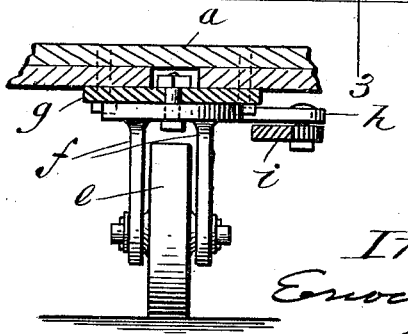
Witnesses:
J. N. Garfield
N. D. Clemons
Inventor:
Enoch Whalley
by Chaffin & Co.
Attorneys.
THE NORRIS PETERS CO., PHOTO-LITHO., WASHINGTON, D. C.

UNITED STATES PATENT OFFICE.

ENOCH WHALLEY, OF WILLIMANSETT, MASSACHUSETTS.

MILL-TRUCK.

SPECIFICATION forming part of Letters Patent No. 685,702, dated October 29, 1901.

Application filed March 29, 1901. Serial No. 53,472. (No model.)

*To all whom it may concern:*

Be it known that I, ENOCH WHALLEY, a citizen of the United States of America, residing at Willimansett, in the county of Hampden and State of Massachusetts, have invented new and useful Improvements in Mill-Trucks, of which the following is a specification.

This invention relates to mill-trucks, and especially to that type having one transversely-located axle and a pivoted guide-wheel centrally located on the truck at each end.

The object of the invention is to provide means for swinging each of the guide-wheels by means of the tongue of the truck into a position in which the axes of said wheels will be substantially radial to the center on which the truck swings; and the invention consists in the construction described in the following specification, and clearly set forth in the claims appended thereto.

In the drawings forming part of this specification, Figure 1 is a plan view of a truck embodying my invention. Fig. 2 is a side elevation of the same; and Fig. 3 is a sectional view on line 3 3, Fig. 2.

Referring to the drawings, $a$ is the platform of the truck, and midway between its ends there is bolted transversely thereof a block $b$ or other analogous support for an axle $c$, on the ends of which are secured the wheels $d$. At the forward and rear ends of the platform, on a central longitudinal line, are located the swiveled guide-wheels $e$. These are mounted in a fork $f$, having a flat head which bears against a plate $g$, secured in any way to the bottom of the platform in proper position, and through said plate and said head a bolt is passed, on which the wheel-supporting fork swivels. Each of said forks is provided with an ear $h$, projecting outwardly in the plane of the platform, and near the under side of the latter these ears project in opposite directions. Pivotally connected with these ears is a curved S-shaped lever $i$, the bend in said lever near each end thereof having a radius greater than the radius of the wheels $e$, to the end that when the wheels are swung into the position shown in Fig. 2 they will escape contact with said lever. The block $b$ is provided with a suitable opening, (shown in dotted lines in Figs. 1 and 2,) through which the lever $i$ passes.

The guide-wheels $e$ being connected together, as described, if one of them be swung in one direction the other will be swung in the opposite direction to the same degree, and to effect this swinging movement one of the forks $f$ has cast thereon two ears $j$, projecting outwardly from the truck at right angles to the axis of the wheel, between which the tongue $k$ is pivotally supported. Thus it is seen that the guide-wheels will assume whatever degree of inclination to the center line of the truck that is taken by the tongue as the truck is moved, the rear wheel swinging in a direction opposite to that of the wheel with which the tongue is connected.

In trucks of this type the guide-wheels are supported at a somewhat less distance below the platform than are the wheels $d$, to the end that the load may be carried only by three of the four wheels.

In trucks of the type described herein not provided with the connected swiveled wheels $e$ when the load happens to be distributed so as to bear on the rear guide-wheel and the two wheels $d$ it cannot be turned short around without great effort unless the weight is brought to bear on the front guide-wheel connected to the tongue; but by the herein-described construction it is immaterial how the load is distributed. The truck may be turned in a circle of which one of the wheels $d$ is the center.

Having thus described my invention, what I claim, and desire to secure by Letters Patent of the United States, is—

1. A mill-truck comprising a suitable platform, a transversely-located axle thereon about midway between its ends, and wheels thereon; a pivotally-supported guide-wheel located at each end of the platform on a longitudinally-central line, a rigid S-shaped lever pivotally connected with each of said guide-wheels and extending from the side of one of said wheels to the opposite side of the other, and a tongue connected with one of the guide-wheels, substantially as described.

2. A mill-truck comprising a suitable platform, a transversely-located axle thereon, midway between its ends, and wheels thereon, a guide-wheel at each end, a forked support for said wheels pivotally connected to the platform, an S-shaped lever, one end of which is connected to one side of one of said forks, and to the opposite side of the other, and a tongue connected to one of said forks, substantially as described.

3. A mill-truck comprising a suitable platform, a transversely-located axle thereon, midway between its ends, and wheels thereon, a guide-wheel at each end, a forked support for said wheels pivotally connected to the platform, an S-shaped lever, one end of which is connected to one side of one of said forks and to the opposite side of the other, the radius of the curve at each end of said lever being greater than the radius of said guide-wheels, and a tongue connected to one of said forks, substantially as described.

ENOCH WHALLEY.

Witnesses:
WM. H. CHAPIN,
K. I. CLEMONS.